United States Patent [19]

Payne et al.

[11] 4,422,569

[45] Dec. 27, 1983

[54] FORMING METAL ARTICLES

[75] Inventors: Dennis J. Payne; Martin H. Mansbridge; John Norton; Sidney J. Swadling, all of Filton, England

[73] Assignee: British Aerospace Public Limited Company, London, England

[21] Appl. No.: 234,265

[22] Filed: Feb. 13, 1981

[30] Foreign Application Priority Data

Feb. 15, 1980 [GB] United Kingdom ............... 8005255

[51] Int. Cl.³ ............................................. B23K 31/00
[52] U.S. Cl. ............................... 228/173 C; 228/265; 228/193
[58] Field of Search ........... 228/265, 193, 194, 173 C; 156/285

[56] References Cited

U.S. PATENT DOCUMENTS 2,423,237  7/1947  Haslacher ........................... 156/282
3,996,019 12/1976  Cogan ................................ 228/193
4,117,970 10/1978  Hamilton ........................... 228/193
4,263,375  4/1981  Elrod ................................. 228/193

OTHER PUBLICATIONS

Paprocki et al., *Gas-Pressure Bonding*, Sep. 25, 1961, DMIC Rep. 159, p. 12.

*Primary Examiner*—Nicholas P. Godici
*Assistant Examiner*—Marc Hodak
*Attorney, Agent, or Firm*—Cushman, Darby & Cushman

[57] ABSTRACT

A method of forming metal articles comprises placing a pair of sheet members 1, 2 or superplastically deformable material in opposed, spaced apart relationship, (conveniently by means of a reinforced member 3), heating them to the temperature range within which superplastic deformation can take place, and urging portions of the sheets toward each other until they lie one against the other thereby to effect bonding. The bonding is preferably by means of diffusion bonding.

7 Claims, 5 Drawing Figures

FORMING METAL ARTICLES

SUMMARY OF THE INVENTION

This invention relates to the forming of metal articles of the type having first and second sheet members of superplastically deformable and bondable metal.

According to one aspect of the invention a method of forming such articles includes the steps of placing two sheet members of superplastically deformable metal in opposed spaced apart relationship, heating them to the temperature range within which superplastic forming can take place, and, whilst maintaining certain opposed parts of the members in spaced apart relationship, urging, by gaseous pressure, the remaining parts of the members toward each other until portions thereof lie one against the other and then bonding these portions one to the other.

Preferably, the sheet members are of diffusion bondable material and the members are heated to a temperature range within which diffusion bonding can take place, so that when said portions lie one against the other, they become diffusion bonded.

It is found that those portions which contact one another and become diffusion bonded can conveniently form a web from the two thicknesses of sheet material which lies generally equidistant from said spaced parts and is substantially flat.

Where reinforced metal articles of the type having a reinforcing member of diffusion bondable material lying between first and second sheet members of superplastically deformable and diffusion bondable metal are to be formed, a forming method according to a further aspect of the invention includes the steps of placing the reinforcing member between the two sheet members to form an assembly in which first regions of the two sheet members contact opposed regions of the reinforcing member, heating the assembly to the temperature range within which superplastic deformation and diffusion bonding can take place, urging the two sheet members toward the reinforcing member such that their first regions become diffusion bonded to it, superplastically deforming the two sheet members toward each other by gaseous pressure such that second regions of each, adjacent the respective first regions, are urged against the reinforcing member and third regions of each, adjacent the respective second regions, are urged to lie one against the other, the second regions of each sheet member regions becoming diffusion bonded to the reinforcing member and the third regions of each sheet member becoming diffusion bonded one to the other.

Preferably the reinforcing member is in the form of a framework or lattice.

It will be appreciated that this invention is not limited to the forming of metal articles having two sheets of metal which is both superplastically deformable and diffusion bondable; some metals which are superplastically deformable are not susceptible to diffusion bonding (for example Aluminium). For such metals different forms of bonding must be employed.

Examples of possible forms of bonding are brazing, eutectic bonding, liquid phase bonding, or by means of a chemical adhesive or by mechanical locking. In the cases where a bonding metal is used to form the bond, this may be applied to a sheet to be bonded by any of the following processes:

Coating; application of a foil; electrolytic plating; vapour deposition; ion plating; ion sputtering; metal spraying; or plasma spray. The bonding metal may be an Aluminium alloy.

Where a chemical adhesive is employed, this may be a high temperature curing resin, for example polyimide adhesive.

DESCRIPTION OF THE PREFERRED EMBODIMENT

Figure 1:
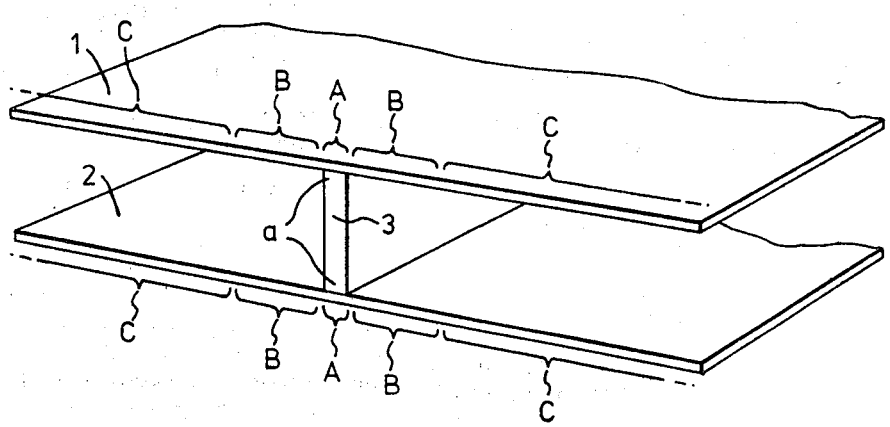
FIGS. 1, 2 and 3 are diagrammatic representations in sequence of a method of forming a stiffened metal panel according to the invention.

In FIG. 1, two sheets 1 and 2 of a diffusion bondable and superplastically deformable metal are placed one to each side of a reinforcing framework 3, that is to say a lattice, exemplified by a single illustrated member. The framework is formed of a diffusion bondable metal. The components 1, 2, and 3 are positioned in a mould tool, 4, but of a suitable design which allows heating to superplastic deformation and diffusion bonding temperatures and also the introduction of a pressurized inert gas to the exterior of the sheets 1 and 2.

As illustrated in FIG. 1, the components 1, 2, and 3 are so positioned within the mould tool that first regions A of the sheets contact opposed regions a of the framework.

The tool (together with the components 1, 2, and 3), is then heated to the desired temperature and the sheets 1 and 2 are urged, by externally applied force or by gas pressure, against the framework 3 so that the first regions A become diffusion bonded to the opposed regions a.

Figure 2:
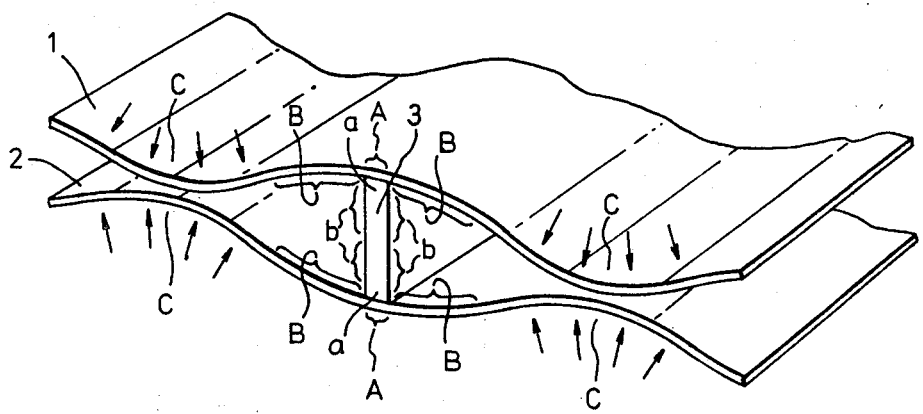
Figure 3:
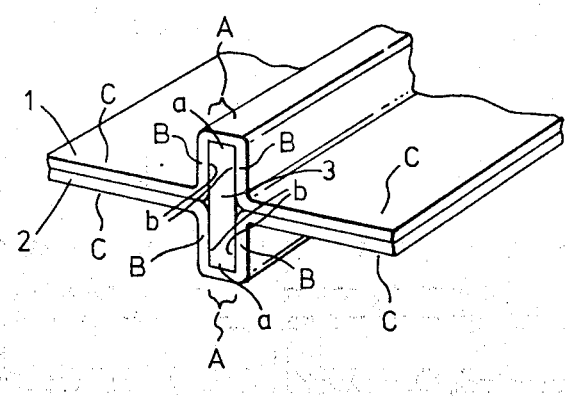
Figure 4:
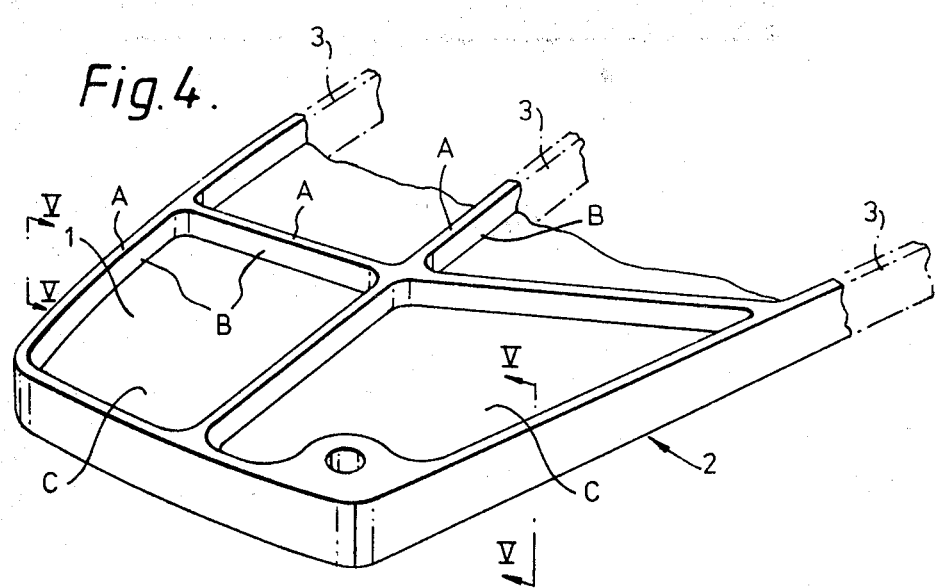
FIG. 4 is a view of a formed panel.
Figure 5:
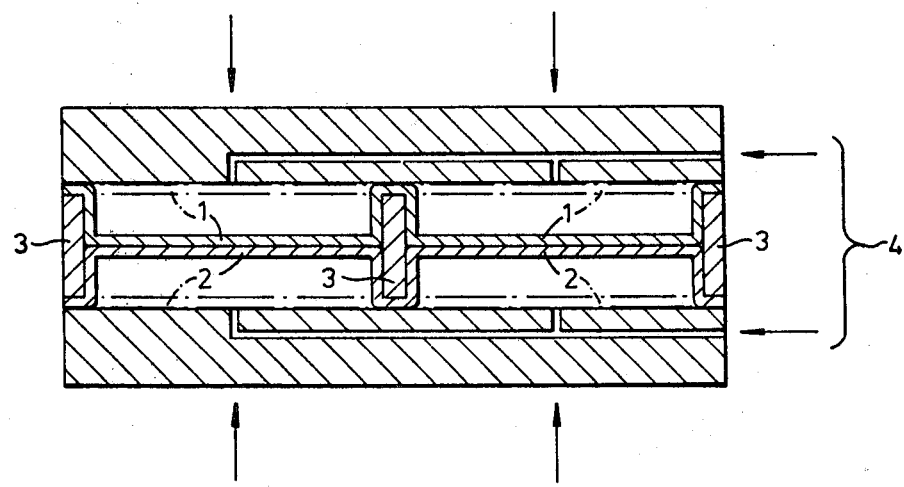
FIG. 5 is a section view of lines V—V of FIG. 4, illustrating the component parts of the panel in a mould tool, before the forming operation (in chain dotted lines) and after the forming operation (in full lines).

Further application of gas pressure simultaneously deforms the sheets 1 and 2 inwardly, that is to say towards each other as illustrated in FIG. 2. It is found that regions B of the sheets 1 and 2 lying to each side of the regions A become folded inwards to lie against flank regions b of the framework 3 and become diffusion bonded to them. Also, it is found that regions C of the sheets 1 and 2, lying to each side of the regions B, abut and become diffusion bonded to one another, forming web from the two thicknesses which lie in a plane generally parallel to the original plans of the sheets 1 and 2. The regions B, it is found, naturally assume similar lengths so that the webs formed by the regions C tend to lie equidistant from the regions A in a flat condition.

The completed panels have stiffness properties and a configuration similar to those panels formed by removal of pockets of material (for example, by machining, electroerosion, or electro-chemical action) from a solid billet.

We claim:

1. A method of forming a stiffened metal panel including a web region and a flange region to stiffen the panel, which method includes the step of:
   (a) placing two sheet members of a superplastically deformable material in opposed, spaced-apart relationship to either side of a reinforcing structure;
   (b) heating the two sheet members to a temperature range within which superplastic deformation can take place;

(c) urging respective first regions of the two sheet members against respective opposed regions of the reinforced structure;

(d) superplastically deforming, by gaseous pressure, the remaining portions of the sheet members so that they bulge towards each other;

(e) continuing said superplastic deformation of the sheet members until respective second regions of each, adjacent the respective first regions, are urged against the reinforcing structure and respective third regions of which adjacent the respective second regions are urged, solely by gaseous pressure to meet each other in a common substantially planar region lying intermediate said opposed regions of the reinforcing structure; and (f) bonding the third regions of one sheet member to those of the other to form said web region, and the reinforcing structure, together with respective first and second regions of the sheet members defining said flange region.

2. A method according to claim 1, in which the two sheet members are of diffusion bondable metal, and the sheet members are heated to a temperature range in which diffusion bonding can take place, so that when said regions lie one against the other, they become diffusion bonded.

3. A method according to claim 1, in which the two sheet members and the reinforcing structure are of diffusion bondable metal, and the assembly is heated to a temperature range in which diffusion bonding can take place, so that the bonding is in the form of diffusion bonding.

4. A method according to claim 1 in which the reinforcing structure is in the form of a framework or lattice.

5. A method according to claim 1, in which a joining agent is applied to at least part of one or both of the regions to be bonded.

6. A method according to claim 1, in which the web region formed by the third regions of said two sheet members lies in a plane generally equidistant from said opposed regions of the reinforcing structure.

7. A method according to claim 1, wherein said first and second regions are bonded to the associated reinforcing structure.

* * * * *